(12) United States Patent
Allsworth et al.

(10) Patent No.: US 11,092,568 B2
(45) Date of Patent: *Aug. 17, 2021

(54) METHOD OF MANUFACTURE FOR AN ION MOBILITY FILTER

(71) Applicants: Owlstone Medical Limited, Cambridge (GB); Owlstone Inc., Westport, CT (US)

(72) Inventors: Max Allsworth, Essex (GB); Daniel Melhirst, Cambridge (GB); Matthew Hart, Cambridge (GB)

(73) Assignees: Owlstone Medical Limited, Cambridge (GB); Owlstone Inc., Westport, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/753,915

(22) PCT Filed: Nov. 15, 2018

(86) PCT No.: PCT/GB2018/053308
§ 371 (c)(1),
(2) Date: Apr. 6, 2020

(87) PCT Pub. No.: WO2019/097234
PCT Pub. Date: May 23, 2019

(65) Prior Publication Data
US 2020/0363373 A1 Nov. 19, 2020

(30) Foreign Application Priority Data
Nov. 16, 2017 (GB) .................... 1718920

(51) Int. Cl.
*G01N 27/62* (2021.01)
*H01J 49/00* (2006.01)
(Continued)

(52) U.S. Cl.
CPC ........ *G01N 27/624* (2013.01); *H01J 49/0018* (2013.01); *H01J 49/068* (2013.01)

(58) Field of Classification Search
CPC . G01N 27/624; G01N 27/622; H01J 49/0018; H01J 49/068
(Continued)

(56) References Cited

U.S. PATENT DOCUMENTS 10,002,750 B2 * 6/2018 Toutoungi ........... H01J 49/0018
2016/0336159 A1 11/2016 Toutoungi et al.

OTHER PUBLICATIONS

European Patent Office, International Search Report and Written Opinion, PCT/GB2018/053308, dated Feb. 22, 2019.

* cited by examiner

*Primary Examiner* — Nicole M Ippolito
(74) *Attorney, Agent, or Firm* — Leveque IP Law, P.C.

(57) ABSTRACT

A method of manufacture for a ion mobility filter is disclosed. The method of manufacturing an ion filter for a spectrometry system includes providing a sheet of conductive material and defining a plurality of ion filters on the sheet. The definition of the plurality of ion filters is achieved by forming an electrode layer for each ion filter on the sheet, where each electrode layer comprises at least one ion channel and an isolation channel surrounding the at least one ion channel. A support layer on each electrode layer is also formed. Each support layer comprises an aperture at least partially aligned with the at least one ion channel. The ion filter is then separated. The risk of contaminants entering the at least one ion channel when separating the ion filters is reduced by surrounding the at least one ion channel with the isolation channel.

20 Claims, 9 Drawing Sheets

(51) Int. Cl.
*H01J 49/06* (2006.01)
*G01N 27/624* (2021.01)

(58) Field of Classification Search
USPC .................................. 250/281, 282, 283, 286
See application file for complete search history.

METHOD OF MANUFACTURE FOR AN ION MOBILITY FILTER

TECHNICAL FIELD

The invention relates to a method of manufacturing a MEMS gas sensor, for example an ion mobility filter which may be used as a field asymmetric ion mobility spectrometry filter.

BACKGROUND

There are various types of MEMS sensors which can be used to analyse gas samples. Such sensors may comprise a gas flow path, e.g. a channel, which is configured to receive a flow of the gas sample. The gas flow path may be in a functional layer of the device and the functional layer may be made from a semiconductor or other conductive material. For example, ion mobility spectrometers are used to detect particular chemicals within gases such as air. Differential mobility spectrometry (DMS) which is also known as field-asymmetric waveform ion mobility spectrometry (FAIMS) is recognised as a powerful tool for separation and characterization of gas-phase ions.

There are various methods for manufacturing microelectromechanical systems (MEMS), for example bulk micromachining or surface micromachining. As an example, FIGS. 1a to 1c illustrate how a gas sensor such as an ion filter may be manufactured. The ion filter 10 comprises an electrode layer 16 supported on a support layer 12. The electrode layer 16 comprises at least one ion channel 14 defined between a pair of positive and negative electrodes. The flow of ions from a sample through the ion channel is controlled by the application of a compensation field and a dispersion field in a known way. The ions which pass through the ion channel are detected by a detector and the resultant output can be analysed to determine the substances which are present in the sample.

The support layer 12 may be made from Pyrex® or a similar insulating material. The outer edge of the support layer 12 is contiguous with the outer edge of the electrode layer 16 and the support layer 12 is annular in the form of a generally rectangular frame. As schematically shown in dashed line in FIG. 1a, the inner edge of the support layer 12 defines an aperture which is at least partially aligned with the ion channel(s) 14 in the electrode layer 16 so that ions can flow through the aperture.

A known method of manufacturing typically comprises bonding the support layer to the electrode layer and subsequently etching the electrode layer to define the electrode(s) and ion channel(s). The electrode layer is typically a silicon wafer and as illustrated in FIG. 1c, a plurality of ion filters is formed on a single silicon wafer. Accordingly, the final step in the method is to separate the individual ion filters within the wafer. This is typically done by cutting or dicing the silicon wafer using a very thin and accurate saw, e.g. a water-cooled circular saw with diamond-tipped teeth.

The applicant has also recognised that during the cutting process, debris can contaminate the ion channel(s). Accordingly, the applicant has recognised the need for an alternative method of manufacturing an ion filter.

SUMMARY

According to the present invention there is provided methods and apparatus as set forth in the appended claims. Other features of the invention will be apparent from the dependent claims, and the description which follows.

We describe a method of manufacturing an ion filter for a spectrometry system, the method comprising: providing a sheet of conductive material; defining a plurality of ion filters on the sheet by forming an electrode layer for each ion filter on the sheet, each electrode layer comprising at least one ion channel and an isolation channel surrounding the at least one ion channel; and forming a support layer on each electrode layer, wherein each support layer comprises an aperture at least partially aligned with the at least one ion channel; and separating the plurality of ion filters.

By surrounding the at least one ion channel with an isolation channel, the risk of contaminants entering the at least one ion channel when separating the ion filters is reduced. The separating may comprise cutting or sawing individual ion filters from the sheet, e.g. cutting along dotted lines which are marked on the sheet to define the individual ion filters within the plurality of ion filters. Cutting or sawing generates debris and thus the isolation channel may be particularly useful when the separating is done in this way. However, an isolation channel surrounding the at least one ion channel necessarily divides the ion filter into at least two pieces and thus the use of a support layer is important to prevent the ion filter from separating into pieces during the manufacturing process.

Forming the electrode layer may comprise etching the at least one ion channel and the isolation channel in the electrode layer. The etching of all channels within an individual filter may be done simultaneously or done in stages. Techniques such as deep reactive ion etching may be used.

Forming the support layer on each electrode layer may comprise bonding the support layer to each electrode layer before etching the at least one ion channel and the isolation channel. The support layer may be an insulating material, e.g. Pyrex®. The support layer may be provided in the form of a frame. In this way, the aperture is pre-formed in the support layer before bonding the support layer. Alternatively, the support layer may be deposited on each electrode layer before etching.

Forming the support layer on each electrode layer may comprise bonding the support layer to each electrode layer after etching the at least one ion channel and the isolation channel. In this arrangement, to prevent the device falling apart, each electrode layer may comprise a conductive layer having a coating and forming the electrode layer comprises etching the at least ion channel and isolation channel through the conductive layer but not the coating.

As an alternative to a preformed support layer or a deposited support layer, forming the support layer may comprise etching the aperture through the support layer after the support layer has been bonded to the electrode layer. The support layer may comprise silicon. An advantage of using a support layer comprising silicon is to facilitate the etching processes. However, in such an arrangement, it is necessary to isolate the silicon in the support layer from the electrode layer and thus at least one of the support layer and the electrode layer may comprise an insulating coating. Both the support layer and the electrode layer may comprise an insulating coating which may be made from the same material (e.g. silicon oxide). Bonding the support layer may comprise bonding the two insulating coatings together to form an insulating layer between the support layer and the electrode layer.

In the arrangement where the support layer comprises a substrate and an insulating layer, the aperture may be etched first through the substrate and then through the insulating layer in a two-step process. For example, the method may comprise etching the substrate using XeF2—xenon difluoride and etching the insulating layer using HF—hydrogen fluoride. Before etching the aperture, the method may comprise inverting the sheet.

The sheet of conductive material may comprise doped silicon whereby the doping increases the conductivity.

The aperture within the support layer may be aligned with the isolation ring. In other words, the aperture may be large enough to allow ions to flow through both the isolation ring and the at least one ion channel in use. Thus, the isolation ring still provides the benefit of reducing contamination in the final cutting step but also acts as an ion channel itself. Thus an ion filter manufactured in this way may be used to improve filter resolution by providing measurements simultaneously at different electric fields.

The support layer may cover the isolation ring. In other words, the aperture may be small enough to prevent ions flowing through the isolation ring in use in a spectrometry system. The aperture may be concentrically aligned with the isolation ring. When the aperture is smaller than the isolation ring, the size of the aperture may be selected to align the aperture with all of the least one ion channels or only with part of the at least one ion channel. There may be non-uniform electric field areas within the at least one ion channel and by aligning the aperture only with the areas of uniform electric field, this may improve filter resolution. For example, the electrode layer may comprise an interdigitated array of electrodes and typically the opposed ends of the electrodes within such an array have non-uniform electrical fields. Accordingly, forming a support layer may comprise forming a support layer which covers opposed ends of the electrodes within the interdigitated array.

We also describe an ion filter manufactured according to the method described above.

We also describe an ion filter for a spectrometry system, the ion filter comprising an electrode layer comprising at least one ion channel between first and second electrode portions and an isolation channel surrounding the at least one ion channel and the first and second electrode portions; and a support layer on the electrode layer, wherein the support layer comprises an aperture at least partially aligned with the at least one ion channel.

The ion filter may comprise a substrate formed from silicon. The electrode layer may comprise a conductive layer formed from doped silicon. At least one of the electrode layer and the support layer may comprise an insulating layer between the substrate and the electrode layer, e.g. to prevent parasitic capacitance between the two silicon layers.

The aperture may be aligned with the isolation ring. In other words, the aperture may be large enough to allow ions to flow through both the isolation ring and the whole of the at least one ion channel in use. Alternatively, the support layer may cover the isolation ring. In other words, the aperture may be small enough to prevent ions flowing through the isolation ring in use in a spectrometry system. The aperture may be aligned with all of the at least one ion channel. In other words, the aperture is large enough to allow ions to pass through all of the ion channels. Alternatively, the first and second electrode portions may each have an array of electrodes which form an interdigitated array of electrodes and the support layer may cover opposed ends of the electrodes within the interdigitated array.

The described ion filters may be incorporated in a spectrometry system and thus we also describe an ion mobility spectrometry system comprising: an ion filter as above; an ionizer for generating the ions with the gas sample; and a detector for detecting the output from the ion filter. The detector may comprise a detecting element, e.g. a pair of detector electrodes, for each ion channel and/or the isolation ring where appropriate.

The system may comprise a processor configured to generate a graphical output for the at least one ion channel and the isolation ring where appropriate, i.e. where the aperture is aligned with both the at least one ion channel and the isolation ring. The graphical output may be based on information, e.g. ion current, which is detected by the detector. The processor may be configured to generate a measurement of ion current at the detector as a function of an applied dispersion field and an applied compensation field for each of the at least one ion channel and the isolation ring. The system may thus comprise a drive signal system for applying the dispersion field and the compensation field, e.g. as is well known in FAIMS. The drive signal system may be selected so as to apply a different electric field to the at least one ion channel and the isolation ring It will be appreciated that the ion filter described above can also be used to filter ions. In particular, we also describe a method of filtering ions from a target chemical in a gas sample, the method comprising: passing the gas sample through the at least one ion channel for filtering ions from a target chemical in the gas sample; passing the gas sample through the isolation ring for filtering ions from the target chemical in the gas sample, wherein the at least one ion channel has a different electric field to the electric field within at least part of the isolation ring.

We also describe a method of detecting ions from a target chemical in a gas sample, the method comprising: ionizing the gas sample to create ions of the target chemical; filtering the ions as described above; and detecting the ions that output from the filter using a detector. The method may also incorporate the features described above in relation to the system.

It will also be appreciated that the method described above could be adapted to any type of MEMS gas sensor. For example, we also describe a method of manufacturing a MEMS gas sensor, the method comprising: defining a plurality of MEMS gas sensors on a first sheet; each gas sensor comprising at least one gas flow path; forming an isolation channel surrounding each at least one gas flow path; forming a support layer on the first sheet, wherein the support layer comprises a plurality of apertures with each aperture at least partially aligned with the at least one gas flow path in the respective MEMS gas sensor; and separating the plurality of MEMS gas sensors. The first sheet may be a sheet of semiconductor material. The first sheet may form a functional layer in the gas sensor.

BRIEF DESCRIPTION OF THE DRAWINGS

For a better understanding of the invention, and to show how embodiments of the same may be carried into effect, reference will now be made, by way of example only, to the accompanying diagrammatic drawings in which:

FIG. 1c shows a silicon wafer incorporating several ion filters of FIG. 1a;

FIGS. 2c to 2e are schematic cross-sections showing a manufacturing process for the ion filter of FIG. 2a;

FIGS. 4a to 4h are schematic cross-sections showing another manufacturing process for the ion filter of FIG. 2a or 3a;

FIG. 6a is a schematic block diagram of a spectrometry system incorporating the ion filters of any one of FIGS. 2a, 3a and 5a;

FIG. 6b is an example of an output from the system of FIG. 6a.

DETAILED DESCRIPTION OF THE DRAWINGS

Figure 1A:
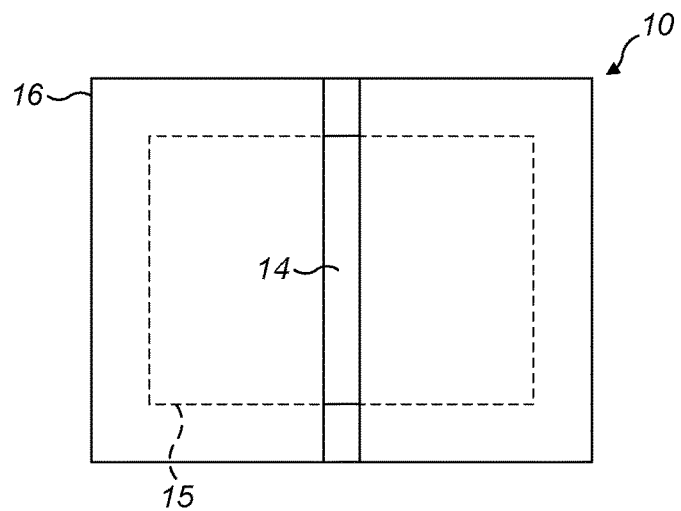
FIGS. 1a and 1b show plan and cross-section drawings of an ion filter manufactured using known methods.
Figure 1B:
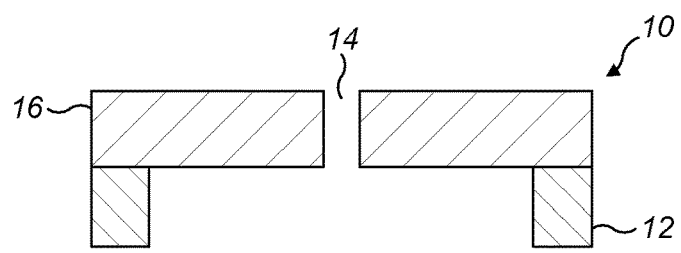
Figure 1C:
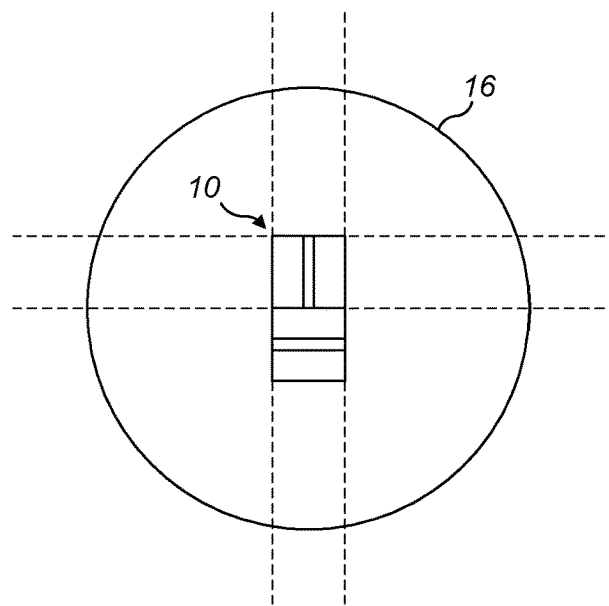
Figure 2A:
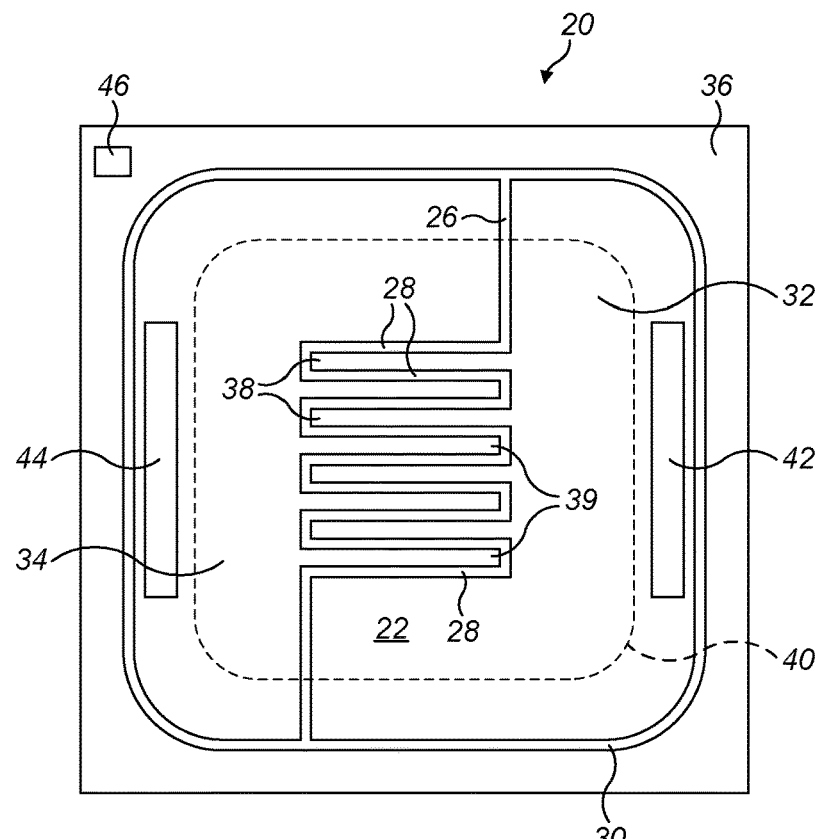
FIGS. 2a and 2b are plan and underside views of an ion filter according to the present invention.
Figure 2B:
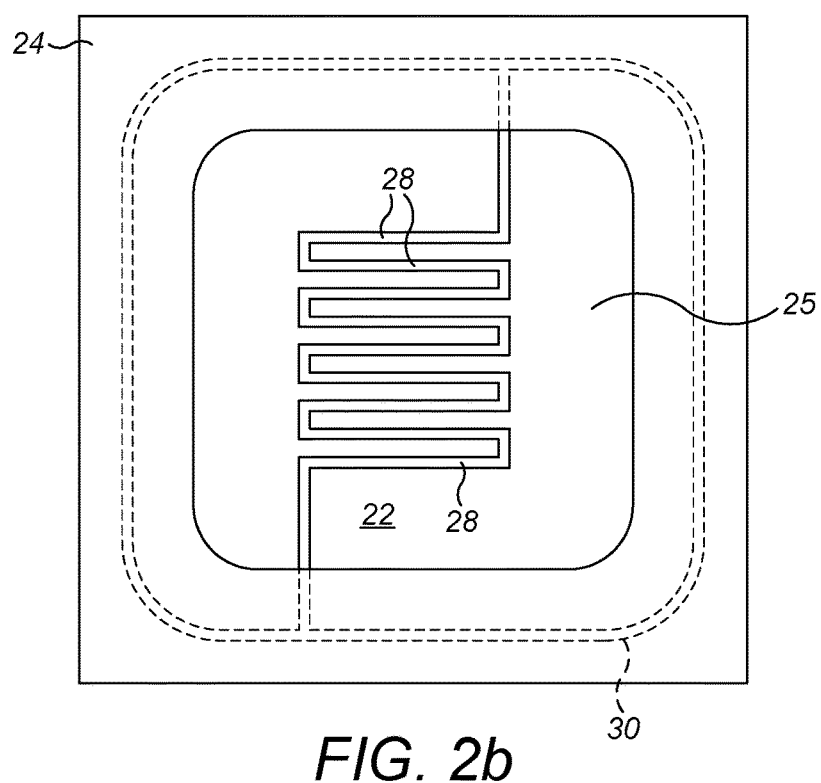

FIGS. 2a and 2b show a first ion filter 20. The ion filter 20 comprises a monolithic electrode layer 22 and a support layer 24. As shown more clearly in FIG. 2a, the electrode layer 22 comprises a continuous channel 26 defining a plurality of ion channels 28 which are generally centrally located within the electrode layer and an outer isolation ring 30 which surrounds the plurality of ion channels 28. The continuous channel divides the electrode layer 22 into three electrode portions. First and second electrode portions 32, 34 are within the isolation ring 30 and are separated from each other by the plurality of ion channels 28. A third electrode portion 36 is separated from the first and second electrode portions 32, 34 by the isolation ring 30. The third electrode portion 36 surrounds the first and second electrode portions 32, 34.

A first electrode bond pad 42 is attached to an upper surface of the first electrode portion 32 and a second electrode bond pad 44 is attached to an upper surface of the second electrode portion 34. In this arrangement, each of the first and second electrode bond pads are adjacent the isolation ring 30 on opposed sides of the plurality of ion channels although it will be appreciated that other locations may be used. A third electrode bond pad 46 is attached to an upper surface of the third electrode portion 36. In this arrangement, the third electrode bond pad 46 is adjacent a corner of the ion filter 20. The bond pads provide connections to a drive circuit (not shown) which sets the voltages of the electrodes. The first electrode portion may be positive and the second electrode portion may be negative (or vice versa). The third electrode may be set a constant but different potential to both the first and second electrode portions.

In this arrangement, the continuous channel 26 comprises a serpentine portion which defines nine separate and parallel ion channels 28. Between each pair of ion channels is an electrode in the shape of a "finger" and the electrodes form an interdigitated array with electrodes extending from the first electrode portion alternating with electrodes extending from the second electrode portion. There are four electrodes 38 which extend from and form part of the first electrode portion and four electrodes 39 which extend from and form part of the second electrode portion. It will be appreciated that the number of ion channels and electrodes is merely indicative and other arrangements can be used.

As shown more clearly in FIG. 2b, the support layer 24 is generally frame-like in shape. The outer edge of the support layer 24 is contiguous with the outer edge of the electrode layer 22 and the inner edge 40 of the support layer 24 is shown in dotted lines in FIG. 2a. The inner edge 40 defines an aperture 25 in the support layer 24 to allow ions flowing through the ion channels to exit the ion filter. In this arrangement, the aperture 25 has an outer edge having a similar shaped outline to the isolation ring 30. The aperture 25 is large enough to expose all of the ion channels 28 but small enough so that the support layer 24 covers the entire third electrode portion, the isolation ring 30 and the outer parts of the first and second electrode portions which in this arrangement carry the first and second electrode bond pads.

As explained in more detail below, a plurality of ion filters are manufactured on a single sheet (typically a silicon wafer). The support layer 24 is bonded to the electrode layer 22 before the individual ion filters are cut from the sheet. The isolation ring 30 helps to reduce the contamination within the ion channels from the cutting process.

Figure 2C:
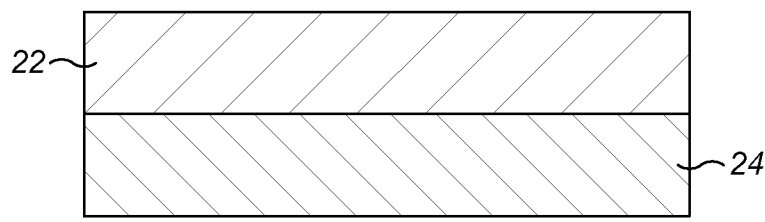
Figure 2D:
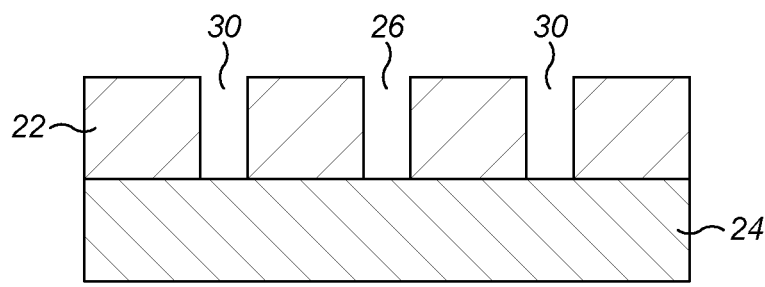
Figure 2E:
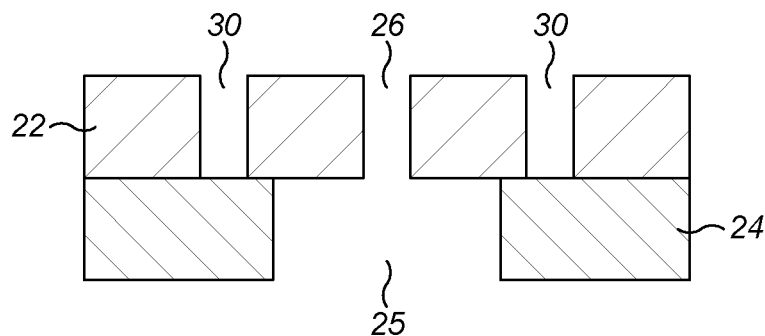

FIGS. 2c to 2e show a method of manufacturing the ion filter of FIG. 2a. In a first step shown in FIG. 2c, the support layer 24 is bonded to the electrode layer 22 using standard techniques. The support layer 24 may be formed from Pyrex® or another insulating material. In a second step shown in FIG. 2d, the continuous channel is etched to form the ion channel 26 (shown for illustrative purposes as a single channel) and the isolation ring 30 which in cross-section forms two separate channels either side of the ion channel 26. In the next step shown in FIG. 2e, the aperture 25 is then etched through the support layer 24. In both etching steps, standard techniques may be used, e.g. deep reactive ion etching (DRIE) for the ion and isolation channels and chemical etching for the support layer.

As an alternative to etching the aperture 25 in the support layer 24 after the bonding process, the aperture may be pre-formed in the support layer 24 before the support layer is bonded to the electrode layer. Alternatively, the support layer 24 may be deposited on the electrode layer in the desired shape, e.g. frame-like with an aperture 25.

Figure 3A:
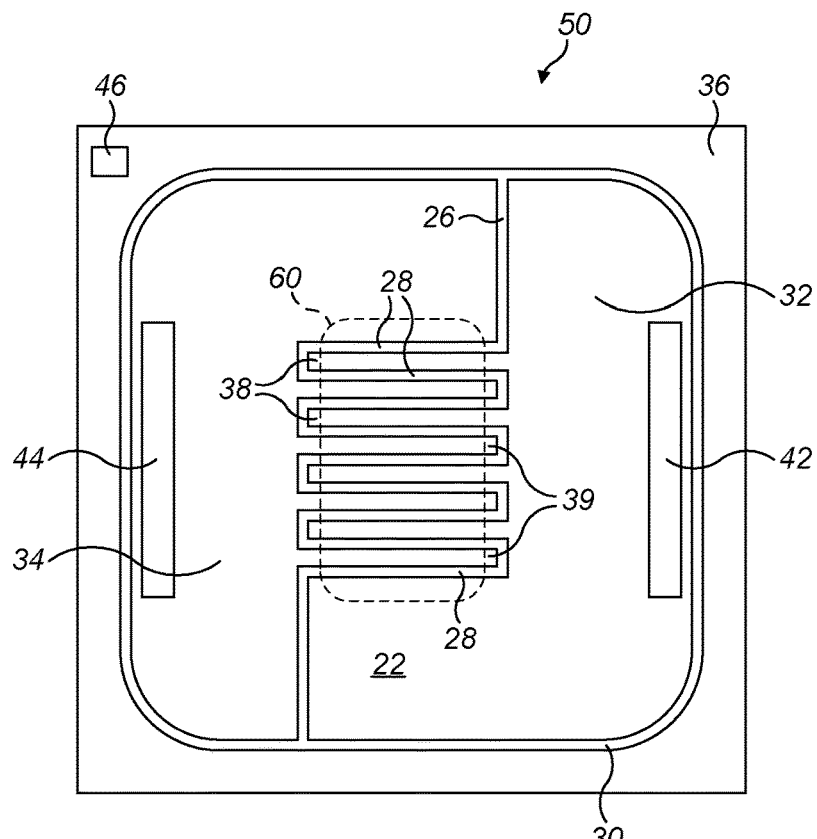
FIGS. 3a and 3b are plan and underside views of a second ion filter according to the present invention.
Figure 3B:
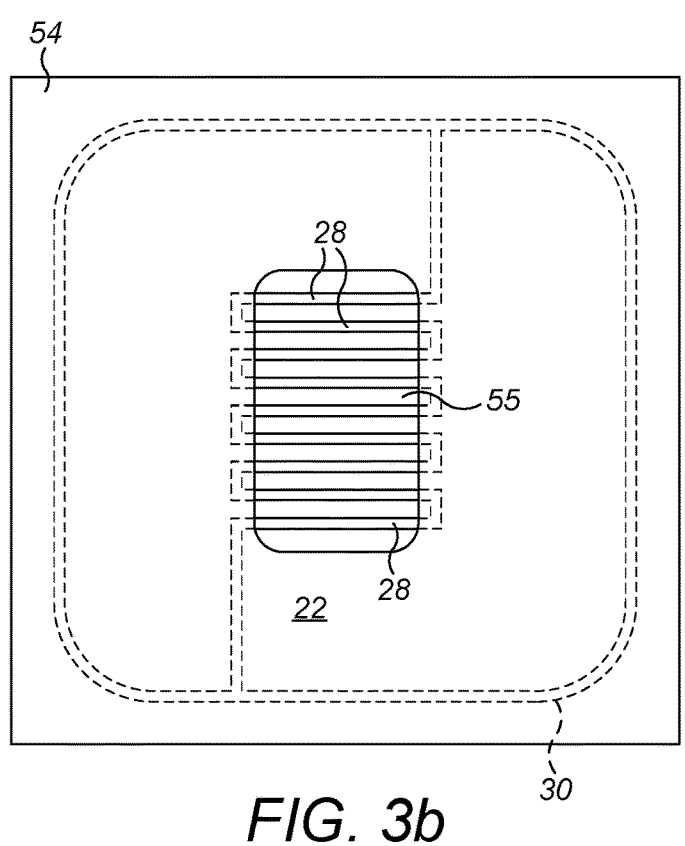

The steps shown in FIGS. 2c to 2e form a plurality of ion filters on a single sheet. The final step is separating the individual ion filters, e.g. using known dicing or sawing techniques. The isolation channel reduces contamination into the ion channels during the dicing process FIGS. 3a and 3b show a second ion filter 50 which is generally similar to that shown in FIGS. 2a and 2b and thus corresponding features have the same reference number. The ion filter of FIG. 3a may be manufactured using the method described above. As in the previous filter, the ion filter 30 comprises a monolithic electrode layer 22 and a support layer 54. There is a continuous channel 26 defining a plurality of ion channels 28 and an outer isolation ring 30 which surrounds the plurality of ion channels 28. The continuous channel divides the electrode layer 22 into three electrode portions 32, 34, 36. First, second and third electrode bond pads 42, 44, 46 are mounted to respective first, second and third electrode portions 32, 34, 36. The first and second electrode portions form an interdigitated array with electrodes 38 extending from the first electrode portion 32 alternating with electrodes 39 extending from the second electrode portion 34.

As shown more clearly in FIG. 3b, the support layer 54 has a central aperture 55. In this arrangement, the central aperture 55 is smaller than that used in the previous embodiment. Thus, the support layer 54 covers the entire third electrode portion 36, the isolation ring 30 and most of the first and second electrode portions 32, 34. Only the electrodes 38, 39 which extend from the first and second electrode portions 32, 34 and which form the interdigitated array of electrodes are aligned with the aperture 55. The portions of the continuous channel joining the individual ion channels which are at the tips of the electrodes can contribute regions of non-uniform electric field. This may reduce filter resolution. This may be improved by preventing ions flowing through these regions using the support layer. Thus, the support layer may provide two benefits, namely allowing the use of an isolation ring to reduce contamination as described above and also improving filter resolution by removing the non-uniform electric field areas of the continuous channel.

FIGS. 4a to 4h illustrate an alternative method of manufacturing the ion filters of FIG. 2a or FIG. 3a. In a first step shown in FIG. 4a, an electrode layer 72 and a support layer 74 are provided. The electrode layer 72 comprises a conductive layer 76, e.g. doped silicon or other suitable material, and an insulating coating 78, e.g. SiOx—silicon oxide or other suitable material. The support layer 74 comprises a substrate 80, e.g. undoped silicon or other suitable material, and an insulating coating 82, e.g. silicon oxide or similar. Using doped silicon increases the conductivity of the conductive layer. Where appropriate, the insulating coatings 78, 82 may be deposited on the respective layers using standard techniques.

Figure 4A:
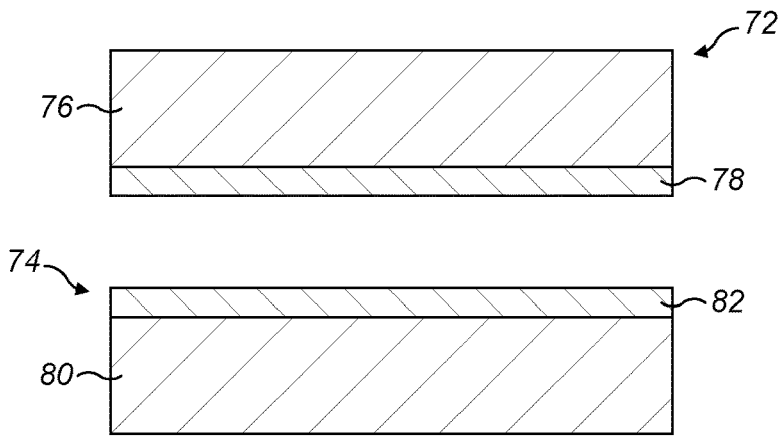
Figure 4B:
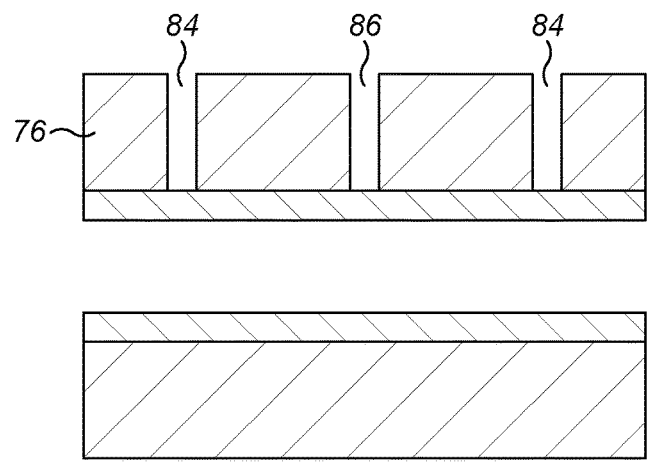

In a second step shown in FIG. 4b, channels are formed through the conductive layer 76. As described above, the channels may form part of a continuous channel and may be formed by any suitable technique, e.g. deep reactive ion etching (DRIE). An isolation ring 84 is formed which provides channels either side of an ion channel 86. It will be appreciated that a single ion channel 86 is indicative and there may be a plurality of ion channels within the isolation ring.

Figure 4C:
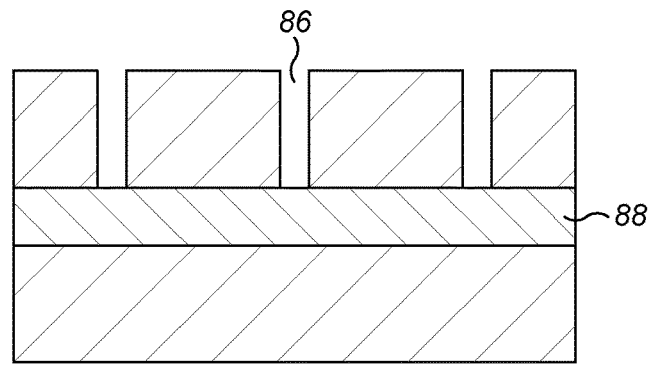
Figure 4D:
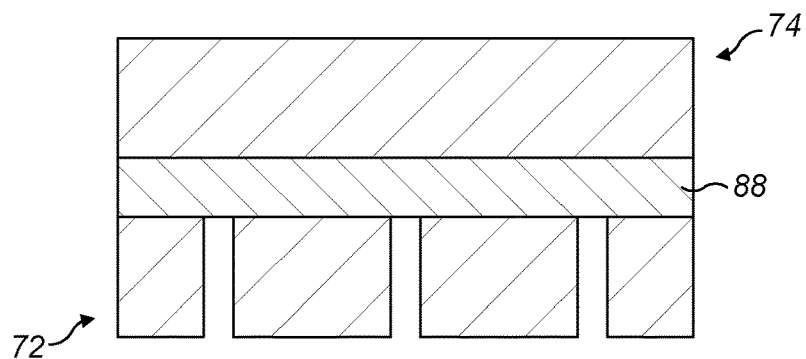

In a third step shown in FIG. 4c, the electrode layer 72 and support layer 74 are bonded together with the two insulating coatings 78, 82 joining to effectively form a single insulating layer 88. The bonding process can be done using any suitable technique. As shown in FIG. 4d, the next step is to invert the device so that the support layer 74 can be etched.

Figure 4E:
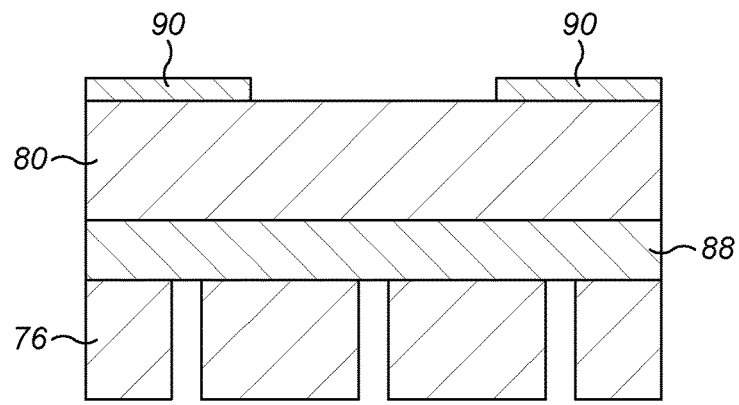
Figure 4F:
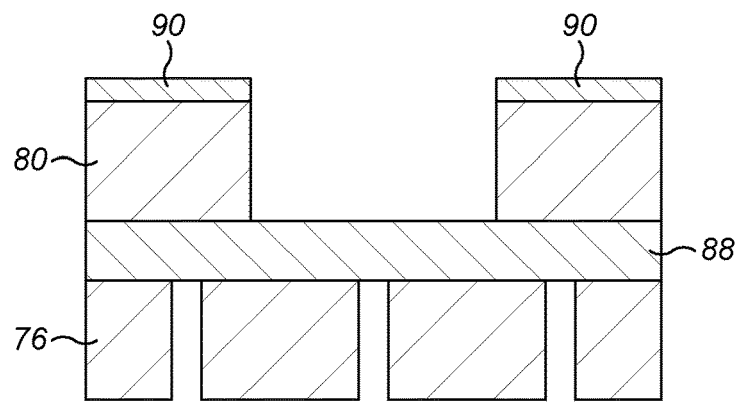

In FIG. 4e, a photoresist mask layer 90 is temporarily placed on the filter. The mask layer 90 prevents portions of the support layer 74 from being removed during subsequent etching steps. In this arrangement, there are two etching steps but it will be appreciated that any suitable etching technique which defines the aperture in the support layer may be used. In a first etching step shown in FIG. 4f, e.g. using xenon difluoride or other suitable material, the substrate 80 within the support layer is removed. In a second etching step, e.g. using hydrogen fluoride or other suitable material, the insulating layer 88 is removed.

Figure 4G:
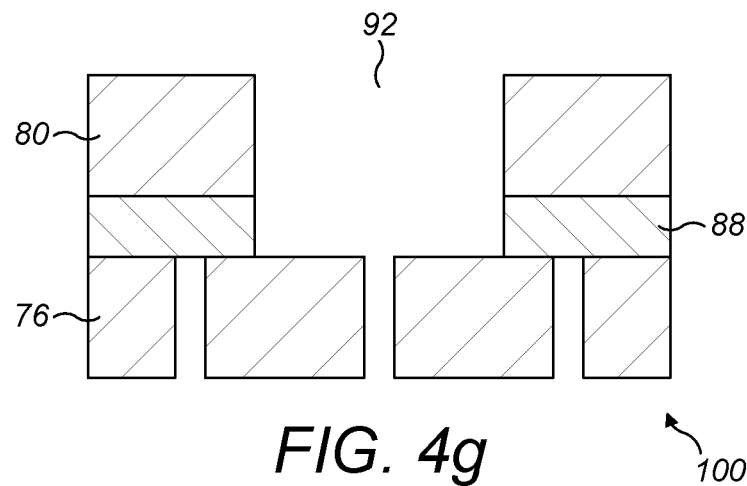

The photoresist mask is then removed to leave an ion filter 100 as shown in FIG. 4g. The ion filter has an aperture 92 through the support layer (substrate 80 and insulating layer 88) through which the gas sample may pass in use. As described above, the aperture 92 is centrally located. Around the aperture, the support layer covers the channels defined by isolation ring so that ions from the gas sample cannot pass through these channels.

Figure 4H:
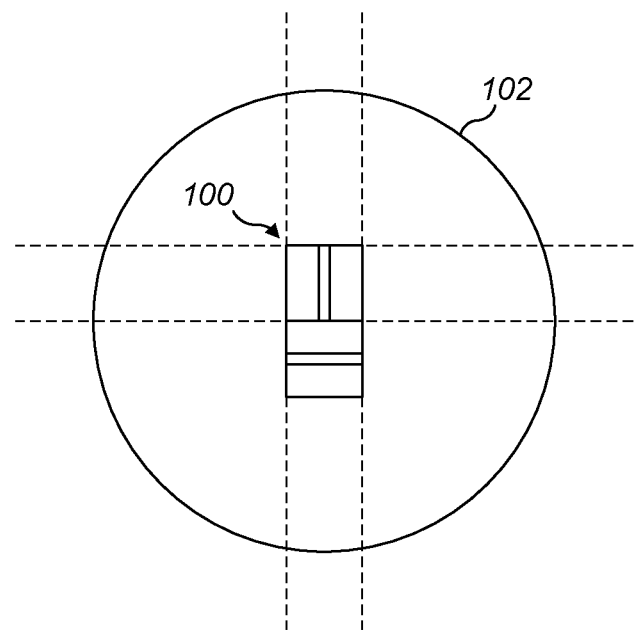

FIG. 4h schematically illustrates that the steps shown in FIGS. 4a to 4g form a plurality of ion filters 100 on a single sheet 102. The final step is separating the individual ion filters, e.g. using known dicing techniques. The isolation channel reduces contamination into the ion channels during the dicing (or similar) process.

When using the manufacturing process shown in FIGS. 2c to 2e, it is important that the bonding step occurs before the etching steps. Otherwise, the electrode portions would be physically separated (and effectively fall away) from the one another. In the method of FIGS. 4a to 4h, the bonding step occurs after the ion and isolation channels have been etched. This is possible because the electrode layer 72 comprises an insulating layer 78 which prevents the electrode portions from being separated from one another. It will be appreciated that in an alternative arrangement, the bonding step could occur before the formation of the ion and isolation channels.

In the manufacturing process shown in FIGS. 2c to 2e, the material of the substrate (e.g. Pyrex®) may mean that it is more difficult to etch the isolation channel and ion channels.

In the example of FIGS. 4a to 4h, the substrate is formed from silicon to improve the etching process. However, using a silicon substrate may introduce additional complications from parasitic capacitance between the silicon substrate and the silicon conductive layer in the electrode layer. This is addressed, for example by using the isolation coatings and/or by using doped silicon in the electrode layer and undoped silicon in the support layer.

Figure 5A:
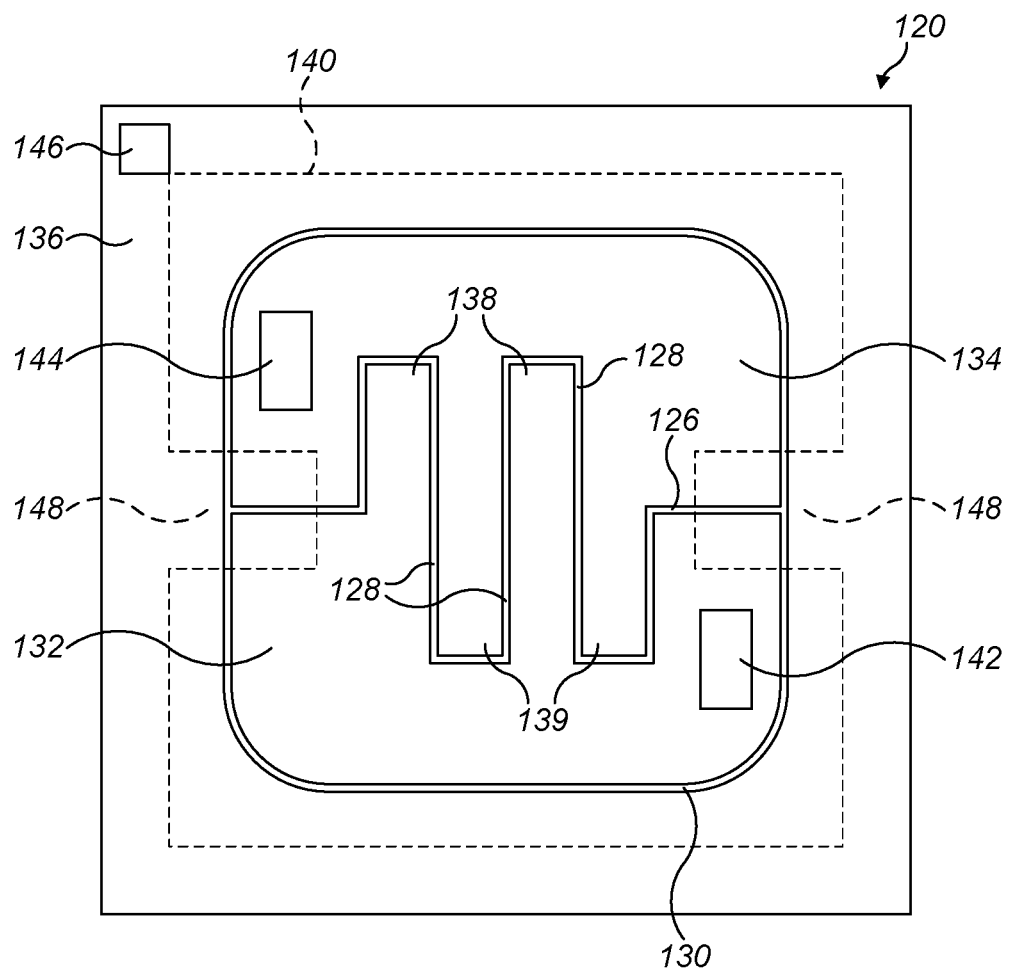
FIGS. 5a and 5b are plan and cross-section views of a third ion filter according to the present invention.
Figure 5B:
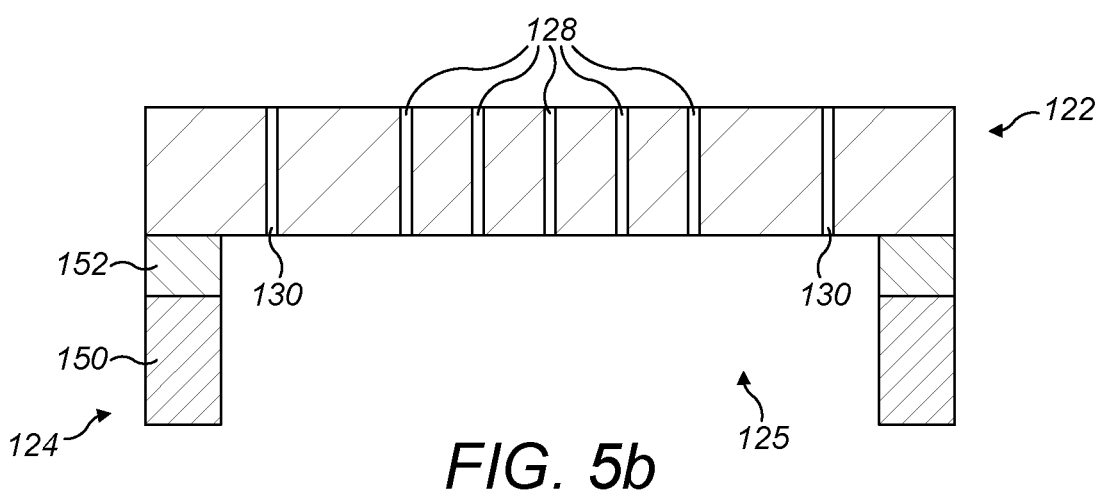

FIGS. 5a and 5b show a third ion filter 120 which may be manufactured using the processes described above. The ion filter is similar to those shown in FIG. 2a or FIG. 3a. The ion filter 120 comprises a monolithic electrode layer 122 and a support layer 124. As shown more clearly in FIG. 5a, the electrode layer comprises a continuous channel 126 defining a plurality of ion channels 128 which are generally centrally located within the electrode layer and an outer isolation ring 130 which surrounds the plurality of ion channels 128. The continuous channel divides the electrode layer 122 into three electrode portions. First and second electrode portions 132, 134 are within the isolation ring 130 and are separated from each other by the plurality of ion channels 128. A third electrode portion 136 is separated from the first and second electrode portions 132, 134 by the isolation ring 130.

A first electrode bond pad 142 is attached to an upper surface of the first electrode portion 132 and a second electrode bond pad 144 is attached to an upper surface of the second electrode portion 134. In this arrangement, each of the first and second electrode bond pads are adjacent the isolation ring 130 on diametrically opposed sides of the plurality of ion channels although it will be appreciated that other locations may be used. A third electrode bond pad 146 is attached to an upper surface of the third electrode portion 136. In this arrangement, the third electrode bond pad 146 is adjacent a corner of the ion filter 120. As in the previous arrangement, the bond pads provide connections to a drive circuit (not shown) which sets the voltages of the electrodes.

In this arrangement, the continuous channel 126 comprises a serpentine portion which defines five separate and parallel ion channels 128. The electrodes 138, 139 between the channels form an interdigitated array. There are two electrodes 138 which extend from and form part of the first electrode portion 132 and two electrodes 139 which extend from and form part of the second electrode portion 134.

The support layer 124 is generally frame-like in shape with two protrusions 148 and as shown in FIG. 5b comprises a substrate 150 (e.g. undoped silicon) and an insulating layer 152 (e.g. silicon oxide or oxide-nitride-oxide). The outer edge of the support layer 124 is contiguous with the outer edge of the electrode layer 122 and the inner edge 140 of the support layer 124 is shown in dotted lines in FIG. 5a. The inner edge 140 defines an aperture 125 in the support layer 124 to allow ions flowing through the ion channels to exit the ion filter. In contrast to the arrangements shown in FIG. 2a or FIG. 3a, the aperture 125 is large enough to expose the isolation channel 130 as well as all of the ion channels 128. Thus, in this arrangement, ions may also flow through the isolation channel 130. The protrusions 148 cover the part of the continuous channel 126 in which the isolation channel 130 and the plurality of ion channels 128 intersect. This is to prevent ions flowing through these sections of the continuous channel because these regions are likely to have a non-uniform electric field and thus reduce the sensitivity of the ion filter.

Figure 6A:
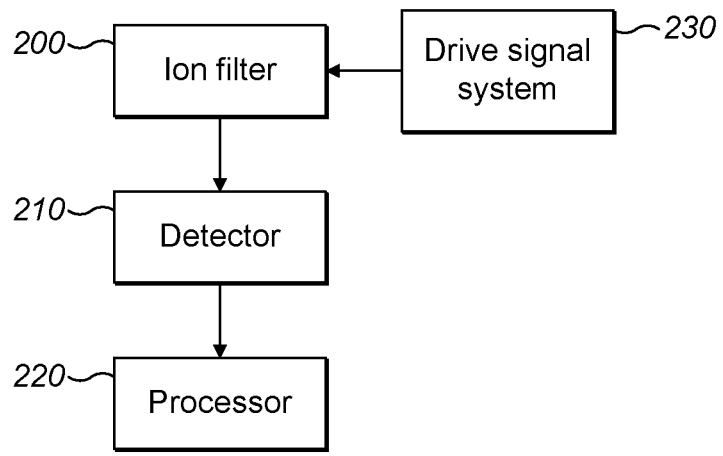

The ion filters described above may be incorporated into a spectrometry system, e.g. a field asymmetric ion mobility system (FAIMS). As shown schematically in FIG. 6, the spectrometry system comprises a drive signal system 230 which sets the potential of the first, second and third electrode portions in the ion filter 200. The drive signal system 230 applies an oscillating electric field together with a DC voltage. The oscillating electric field comprises a variable high-voltage asymmetric waveform of low voltage pulse duration t(s) and high voltage pulse duration τ(s) and peak voltage $V_D$ is applied to create the variable field of $V_D/g$ (kVcm$^{-1}$). The mobility of each ion within the ion filter (also termed a separator) oscillates between a low-field mobility $K_0$ and a high-field mobility $K_E$ and the difference between the high-field mobility and low field mobility is termed ΔK. Ions of different chemicals will have different values of ΔK and the ions adopt a net longitudinal drift path length ($d_h$-$d_t$) through the ion filter which is determined by their high and low field drift velocity ($v_{D(h)}$ and $v_{D(l)}$ and the high field and low field pulse durations. The DC voltage is a bias DC "tuning voltage" ($V_c$) which enables subtle adjustment of the peak voltage $V_D$ to counter the drift experienced by an ion of a specific ΔK. Only ions in a "balanced" condition will exit from the ion filter and be detected by the ion detector 210.

Figure 6B:
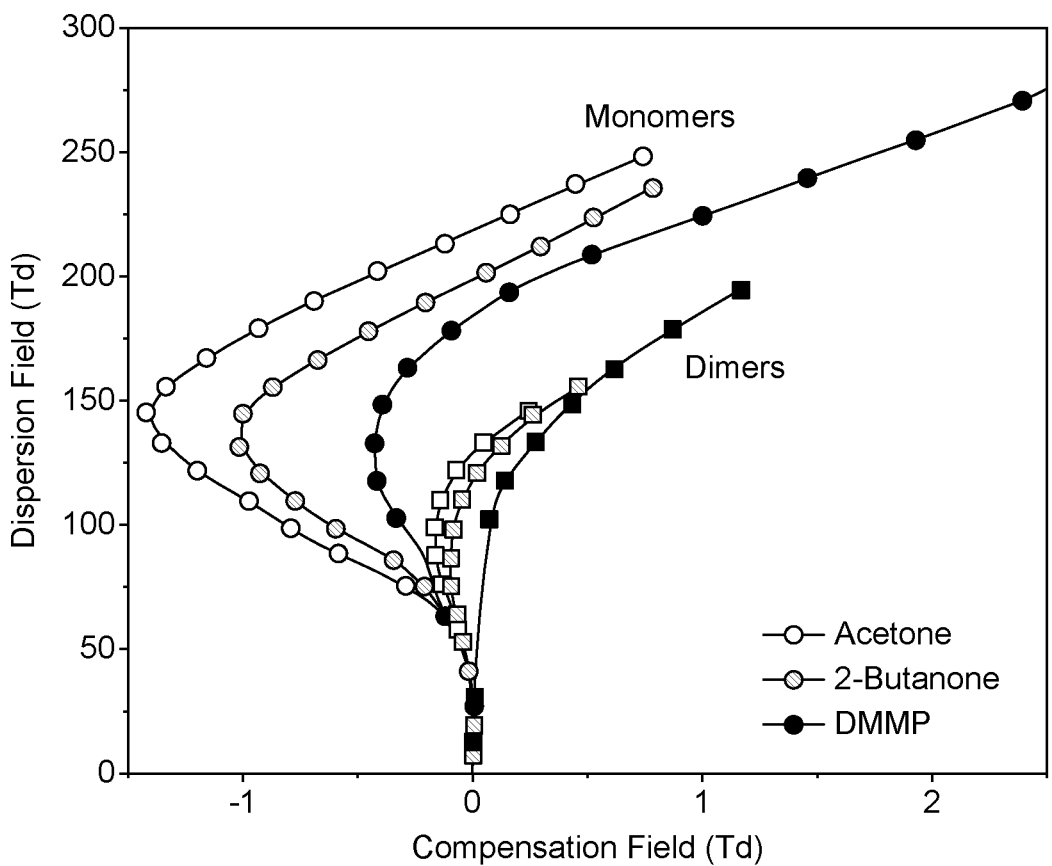

The output from the detector 210 is sent to a processor 220 which may be local (i.e. within the ion filter) or remote (i.e. in a separate computer/server). The processor is adapted to extract numerical parameters which facilitate chemical detection, identification, classification and/or quantification of the ions. For example, the processor may be configured to generate an output as shown in FIG. 6b in which the measurement of ion current at the detector is plotted as a function of the applied electric field resulting from the asymmetric waveform which is known as the dispersion field $E_D$ (kVcm$^{-1}$) and the applied electric field resulting from the DC voltage which is known as the compensation field $E_c$ (kVcm$^{-1}$). The spectral output may alternatively be presented as an m×n matrix of ion current measurements at m compensation field and n dispersion field settings. The graphs which are output from the processor can then be matched with known graphs collected under the same conditions to detect and identify a particular chemical.

It is known that at certain conditions, it may be difficult to distinguish between the graphs of two chemicals. The arrangement of FIG. 5a may provide a solution to this problem by providing channels having different electric fields. For example, the drive signal system may provide the appropriate signals (e.g. via the bond pads) to give a first electric field in the ion channels between the first and second electrode portions 132, 314, a second electric field in the part of the isolation ring 130 between the first electrode portion 132 and the third electrode portion 136 and a third electric field in the part of the isolation ring 130 between the second electrode portion 134 and the third electrode portion 136. Each of the first, second and third electric fields may be different and by measuring ions through different electric fields simultaneously, this increases the likelihood that a correct chemical identification will occur because the likelihood of two chemicals having overlapping graphs at multiple different electric fields is low. Furthermore, running with multiple different electric fields simultaneously is more efficient than operating the system multiples time for each electric field and thus the chemical identification process is less time consuming.

Although a few preferred embodiments of the present invention have been shown and described, it will be appreciated by those skilled in the art that various changes and modifications might be made without departing from the scope of the invention, as defined in the appended claims.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of manufacturing an ion filter for a spectrometry system, the method comprising:
   providing a sheet of conductive material;
   defining a plurality of ion filters on the sheet, including:
      forming an electrode layer for each ion filter on the sheet, each electrode layer including at least one ion channel between first and second electrode portions and an isolation channel surrounding the at least one ion channel and the first and second electrode portions, and
      forming a support layer on each electrode layer, each support layer including an aperture at least partially aligned with the at least one ion channel; and
   separating the plurality of ion filters.

2. The method of claim 1, further comprising forming each electrode layer by etching the at least one ion channel and the isolation channel.

3. The method of claim 2, wherein said forming the support layer on each electrode layer comprises bonding the support layer to each electrode layer before etching the at least one ion channel and the isolation channel.

4. The method of claim 3, wherein said forming the support layer comprises providing a support layer in the form of a frame.

5. The method of claim 2, wherein said forming the support layer on each electrode layer comprises bonding the support layer to each electrode layer after etching the at least one ion channel and the isolation channel.

6. The method of claim 5, wherein each electrode layer comprises a conductive layer with a coating, and said forming each electrode layer comprises etching the at least one ion channel and the isolation channel through the conductive layer only.

7. The method of claim 6, wherein each support layer comprises a substrate with a coating, and said bonding the support layer comprises bonding the coating on the support layer to the coating on the electrode layer together to form an insulating layer between the support layer and the electrode layer.

8. The method of claim 7, wherein said forming the support layer comprises etching the aperture through the substrate and then through the insulating layer after bonding each support layer to each electrode layer.

9. The method of claim 8, wherein said forming the support layer comprises inverting the sheet after bonding each support layer to each electrode layer and before etching the aperture.

10. The method of claim 7, wherein the substrate comprises silicon.

11. The method of claim 1, wherein the sheet of conductive material comprises doped silicon.

12. The method of claim 1, further comprising forming a support layer which covers the isolation ring.

13. The method of claim 12, further comprising forming an electrode layer having an interdigitated array of electrodes and forming a support layer which covers opposed ends of the electrodes within the interdigitated array.

14. An ion filter for a spectrometry system, the ion filter comprising:
an electrode layer comprising at least one ion channel between first and second electrode portions and an isolation channel surrounding the at least one ion channel and the first and second electrode portions; and
a support layer on the electrode layer, wherein the support layer comprises an aperture at least partially aligned with the at least one ion channel.

15. The ion filter of claim 14, wherein the electrode layer comprises a conductive layer formed from doped silicon.

16. The ion filter of claim 14, wherein the aperture is aligned with the isolation ring.

17. The ion filter of claim 14, wherein the aperture is aligned with all of the at least one ion channels.

18. An ion mobility spectrometry system, comprising:
an ion filter as set out in claim 14;
an ionizer for generating ions within the gas sample; and
a detector for detecting an output from the ion filter.

19. A method of filtering ions from a target chemical in a gas sample using the ion filter of claim 14, the method comprising:
passing the gas sample through the at least one ion channel for filtering ions from a target chemical in the gas sample;
passing the gas sample through the isolation ring for filtering ions from the target chemical in the gas sample,
wherein the at least one ion channel has a different electric field to the electric field within at least part of the isolation ring.

20. The ion filter of claim 14, wherein the isolation channel is configured to reduce a risk of contaminants or debris generated during the separation process entering the at least one ion channel.

* * * * *